United States Patent
Michalopoulos et al.

(10) Patent No.: US 8,018,705 B2
(45) Date of Patent: Sep. 13, 2011

(54) SPARK GAP PROTECTION DEVICE

(75) Inventors: Aristidis Michalopoulos, Johannesburg (ZA); Ian Robert Jandrell, Kyalami (ZA); John Michael Van Coller, Braamfontein (ZA); Andreas Alan Beutel, Johannesburg (ZA)

(73) Assignee: University of Witwatersrand (ZA)

( * ) Notice: Subject to any disclaimer, the term of this patent is extended or adjusted under 35 U.S.C. 154(b) by 0 days.

(21) Appl. No.: 12/784,987

(22) Filed: May 21, 2010

(65) Prior Publication Data

US 2010/0296219 A1    Nov. 25, 2010

Related U.S. Application Data

(63) Continuation of application No. 12/066,986, filed as application No. PCT/IB2006/002530 on Sep. 14, 2006, now Pat. No. 7,787,230.

(30) Foreign Application Priority Data

Sep. 14, 2005 (ZA) .................................. 2005/07376

(51) Int. Cl.
 *H02H 7/20* (2006.01)
(52) U.S. Cl. ....................................................... 361/112
(58) Field of Classification Search .................... 361/112
 See application file for complete search history.

(56) References Cited

U.S. PATENT DOCUMENTS

| | | | |
|---|---|---|---|
| 2,497,166 A | 2/1950 | Goldberg et al. | |
| 3,845,322 A | 10/1974 | Aslin | |
| 5,995,352 A | 11/1999 | Gumley | |
| 7,755,873 B2 * | 7/2010 | Crevenat et al. | 361/91.1 |
| 7,787,230 B2 * | 8/2010 | Michalopoulos et al. | 361/112 |
| 2004/0070913 A1 | 4/2004 | Macanda | |
| 2008/0310072 A1 * | 12/2008 | Michalopoulos et al. | 361/117 |
| 2009/0154044 A1 * | 6/2009 | Crevenat et al. | 361/91.1 |
| 2009/0213504 A1 * | 8/2009 | Hallstrom et al. | 361/16 |
| 2010/0296219 A1 * | 11/2010 | Michalopoulos et al. | 361/112 |

FOREIGN PATENT DOCUMENTS

| | | |
|---|---|---|
| DE | 1009709 | 6/1957 |
| EP | 1628378 A1 | 2/2006 |
| FR | 2874288 A1 | 2/2006 |
| WO | 98/10489 A1 | 3/1998 |

* cited by examiner

*Primary Examiner* — Ronald W Leja

(74) *Attorney, Agent, or Firm* — Nelson Mullins Riley & Scarborough LLP; Anthony A. Laurentano

(57) ABSTRACT

A spark gap protection device is provided. The device comprises a plurality of spark gaps and a plurality of windings. Each spark gap is connected to at least one winding which is inductively coupled to an associated winding connected to another spark gap so that, in use, a surge current flowing across a spark gap and through a winding connected to the spark gap induces a voltage in the associated inductively coupled winding connected to another spark gap. This forces the other spark gap to trigger, thereby distributing the surge current between the spark gaps.

8 Claims, 6 Drawing Sheets

SPARK GAP PROTECTION DEVICE

RELATED APPLICATION INFORMATION

This application is a continuation of, and claims priority to, U.S. patent application Ser. No. 12/066,986, filed on Jul. 9, 2008 and entitled "Spark Gap Protection Device," which is the national phase of International Application Number PCT/IB2006/002530, filed on Sep. 14, 2006, which claims priority to South African Patent Application Number 2005/07376, filed on Sep. 14, 2005. The contents of the above-mentioned applications are hereby incorporated by reference.

BACKGROUND OF THE INVENTION

This invention relates to a spark gap protection device which is used to protect a circuit from a transient or surge overvoltage or current.

Various spark gap devices are used in lightning protection devices, commonly known as surge protective devices. For example, in a lightning protection device gas-type spark gaps are used to protect an electrical circuit against transient overvoltages.

Gas-type spark gaps are electrical elements which normally have a very high electrical resistance, which can be considered infinite (e.g. an open circuit). When this type of spark gap instantaneously breaks down or trips under a transient high voltage, the spark gap triggers and conducts current at a very low resistance which is similar to a short circuit. The spark gap breaks down when the overvoltage exceeds the trip voltage of the spark gap and conducts a discharge current, caused by the transient overvoltage, to earth. The spark gap device thereby protects a downstream circuit against any transient overvoltages above the threshold value of the trip voltage.

For example, electrical circuits operating at 220V may use a spark gap protection device with a trip voltage of 500V. This trip voltage would typically be higher than the normal operating voltage, but below the voltage that would be hazardous to the electrical circuit to be protected.

Spark gaps, and in particular the gas-type spark gaps, also have a surge current rating which is dependent on the construction of the spark gaps. The surge current rating indicates the current level above which the spark gap cannot conduct currents without being damaged or destructed. As transient overvoltages occur randomly with varying intensities, spark gaps are subjected to erosion and damage that cannot be predicted. Although it is possible to construct spark gap protection devices with high enough current ratings to withstand high overvoltages and surge currents and to alleviate some of the effects of erosion and damage, such devices are bulky, complex and expensive to manufacture.

U.S. Pat. No. 4,267,484 shows a parallel multi-electrode spark gap switch used to switch high peak currents. The multiple electrodes extend from a peripheral edge of a main electrode and are aligned with corresponding electrodes on a facing electrode. When subjected to a trigger, one pair of electrodes will break over and conduct before the other electrodes. However, as this happens, the current build up in the pair of electrodes will cause a flux time rate, of change in the high permeability cores of ferrite. material that surround the electrodes. By transformer action, these cores will cause the remaining aligned pairs of electrodes to increase in potential difference and to break down one by one, until all are conducting, thereby sharing the surge current.

US Patent Application Publication No. 2004/0070914 shows a lightning arrester device for protecting an electrical circuit connected to a low-voltage network against transient overvoltages. This document discloses a lightning arrestor device that has a plurality of gas-type spark gaps which individually has a surge current rating below a desired surge current rating of the device. The spark gaps may be designed to trip simultaneously in parallel by controlling the construction of the spark gaps. In this prior art document a set of varistors is connected in series with the spark gaps, and one or more thermal disconnects are arranged between the varistors and the spark gaps so that the thermal disconnect will disconnect when the varistor heats excessively as a result of surge current reaching excessive levels. Visual indication of such failure may also be provided.

A problem that has been identified with some of the prior art spark gap protection devices is that not all the spark gaps which may be connected in parallel would trigger. For example, where parallel spark gaps are used, a surge voltage may appear across the terminals of the spark gaps, which will cause the spark gap—with the lowest spark-over voltage to trigger first.

As explained, this spark gap becomes a short circuit, causing all parallel spark gaps to have a low voltage (almost zero volts) across their terminals. The voltage across the parallel combination is accordingly not sufficient for the spark gaps which have not flashed over to trigger. The one spark gap that has sparked over will conduct the entire surge current. As the surge current may exceed the rating of the spark gap, it may be damaged because the surge current rating of the individual spark gap is lower than the total desired rating of the parallel combination of spark gaps.

In some instances, there may be a probability that the conducting spark gap may ionize the surrounding spark gaps, allowing them to flash over, but this process does not guarantee repeatability, i.e. that other spark gaps will be ionized for every surge current conducted. These types of spark gap protection devices may accordingly not have the required reliability.

The main drawbacks of the existing spark gap protection devices where parallel firing is achieved are that specialised spark gaps are needed for the construction of the protection devices, as "off the shelf spark gaps cannot be used and that the manufacture of these protection devices necessitates custom machining, which increases the cost of manufacturing the protective devices.

It is an object of the invention to provide an alternative spark gap protection device.

SUMMARY OF THE INVENTION

According to one aspect of the invention there is provided a spark gap protection device comprising a plurality of spark gaps and a plurality of windings, each spark gap being connected to at least one winding which is inductively coupled to an associated winding connected to another spark gap so that, in use, a surge current flowing across a spark gap and through a winding connected to the spark gap induces a voltage in the associated inductively coupled winding connected to another spark gap, forcing the other spark gap to trigger, thereby distributing the surge current between the spark gaps.

The plurality of spark gaps may be at least one pair of spark gaps, each spark gap in the pair of spark gaps being connected to a winding, which is inductively coupled to the winding connected to the other spark gap in the pair.

The plurality of spark gaps may be multiple pairs of spark gaps, the inductively coupled windings of each pair of spark gaps being connected to another winding which is in turn inductively coupled to a winding connected to inductively coupled windings of another pair of spark gaps.

Optionally, each of the plurality of spark gaps is connected to a winding on each side of the spark gap, with each winding being inductively coupled to a winding connected to a different spark gap.

In one embodiment, each of the plurality of spark gaps may be a three-terminal spark gap, with one spark gap terminal of each of the spark gaps being connected to the winding which is inductively coupled to the associated winding connected to the other spark gap, and wherein another terminal of each of the spark gaps is connected to the associated winding," thereby forcing the other spark gap to first trigger partially over the two terminals connected to the inductively coupled windings. Typically, the partial trigger of the other spark gap causes the spark gap to trigger completely, thereby to distribute the surge current between the spark gaps.

The plurality of windings may be one winding pair.

Typically, the inductively coupled windings are reverse connected, with a positive voltage in the one winding inducing a negative voltage in the other winding.

The spark gaps may be hermetically sealed or may be any type of gas-type spark gaps.

Preferably, each of the inductively coupled windings has a corresponding core, e.g. a ferrite core.

DESCRIPTION OF PREFERRED EMBODIMENTS

Figure 1:
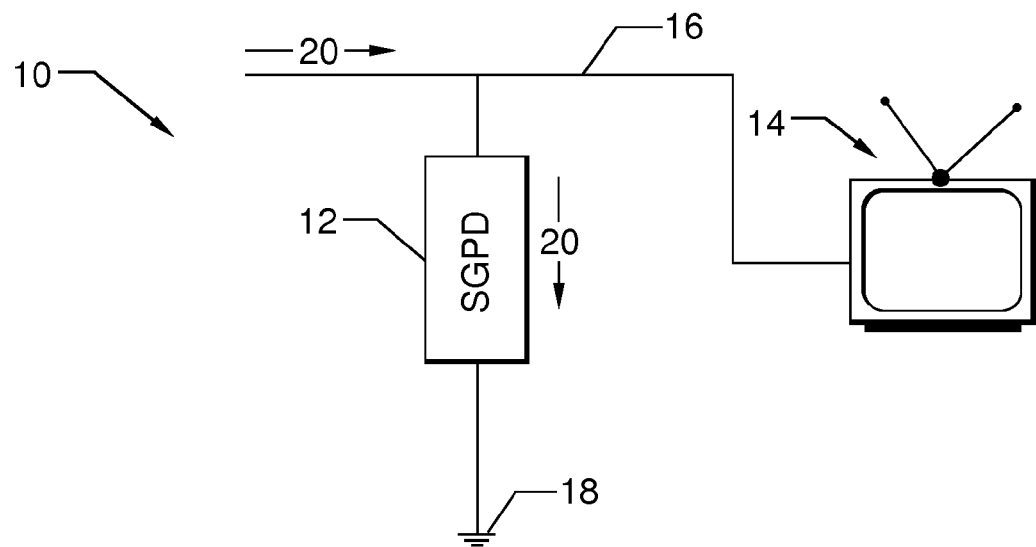
FIG. 1 shows a schematic drawing of a system in which a spark gap protection device, in accordance with the invention, is used.

Referring to FIG. 1, a system 10 in which a spark gap protection device (SGPD) 12 is used is shown. Spark gap protection devices are generally used as surge protective devices or as components in surge protective devices. A surge protection device is used to protect electrical equipment and/or installations from transient or surge (e.g., short duration) overvoltages and/or overcurrents caused by, for example, lightning or system switching.

In order to protect a load 14, such as a television, the spark gap protection device 12 is connected between the line 16 to be protected and an earth terminal 18. In the event that a surge current, shown by arrow 20, flows in the line 16, the spark gap protection device 12 diverts the surge current to the earth terminal 18, thereby protecting the load 14 which is connected downstream from the spark gap protection device 12.

It will be appreciated that although spark gap protection devices of varying ratings are described below, the spark gap protection device in accordance with the invention may be used in systems of any load voltage or current rating, and on "different systems, such as power supply systems, telecommunication systems or control systems. However, the spark gaps and windings used in the spark gap protection device have to be rated according to the particular system.

In one embodiment of the invention, the spark gap protection device is used to protect equipment in a low voltage network. This may typically be in a high energy application, for example, as a first protective device against a direct lightning strike to a line. This type of application is defined as a Class I application in terms of the International Electrotechnical Commission (IEC), in particular IEC 61643-1 (2005): Low-voltage surge protective devices—Part 1: Surge protective devices connected to low-voltage power distribution systems—Requirements and tests; as well as IEC 61312-1 (1995): Protection against lightning electromagnetic impulse—Part 1: General principles. These applications typically require the testing of the devices with high-energy impulses, generally of the 10/350 µs waveform.

Figure 2:
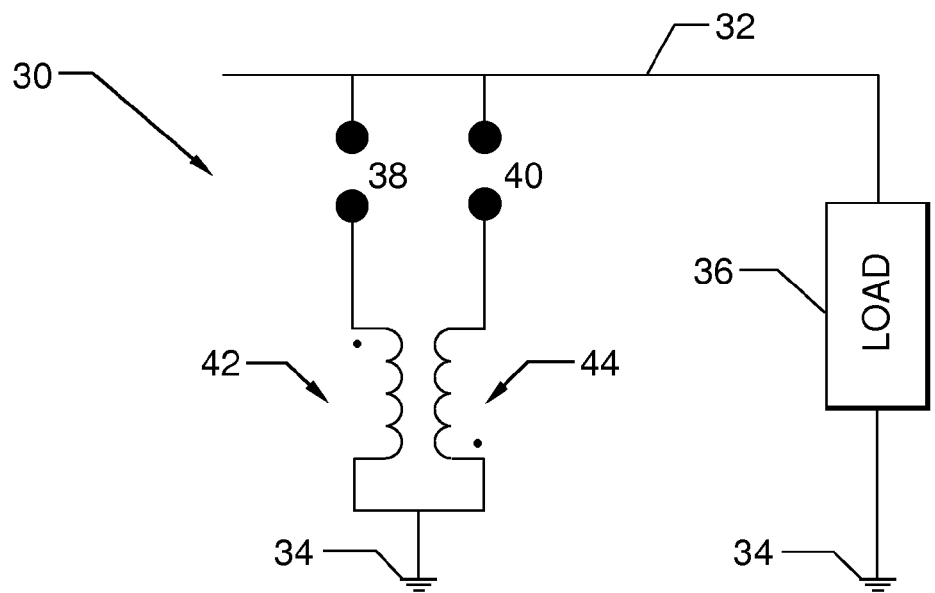
FIG. 2 shows a circuit diagram of a spark gap protection device according to a first embodiment of the invention.

Turning to FIG. 2, a spark gap protection device 30 is connected between a line 32 (or input terminal) and an earth terminal 34, thereby to protect a load 36 against transient or surge overvoltages and currents. The spark gap protection device 30 comprises two parallel spark gaps, generally indicated by reference numerals 38 and 40 respectively. Spark gap 38 is connected to a first winding 42 which is inductively and closely coupled to an associated winding, i.e., the second winding 44, which is in turn connected to spark gap 40.

Each spark gap 38 and 40 comprises two electrodes that are separated by a suitable insulator, the insulator providing the spark gap with a high inherent impedance. In the event that an overvoltage occurs over the spark gap, an electrical breakdown occurs that results in the formation of an electric arc, which is capable of carrying current between the electrodes. While the current is flowing through the spark gap, the spark gap has a low impedance, similar to a short circuit.

It is a well-known principle that when current flows through a conductor or winding, it radiates magnetic flux, i.e. a magnetic field is produced around the winding. If another winding is placed in this field, some of the flux produced by the first winding links with the second winding and a voltage is induced in the second winding. The following factors may increase the flux linkage between the windings, and hence increase the induced voltage:

1. The distance between the windings—the closer the windings are together, the better the linkage, e.g., twisting the windings together improves the linkage;

2. Winding the conductor around a core, e.g., a magnetic material provides better coupling as less flux is wasted; and 3. Increasing the length of the winding.

As shown by the dot convention, the first winding 42 is reverse connected to the second winding 44. According to this connection configuration, when a voltage occurs over the first winding 42 due to a current flowing in this winding, an equivalent negative voltage is induced in the second winding 44. Similarly, when a voltage occurs over the second winding 44, an equivalent negative voltage will be induced in the first winding 42.

In the event that a transient overvoltage occurs in the system, the overvoltage will trigger spark gap 38 by causing an electrical breakdown of the insulator of the spark gap 38, thereby allowing a surge current to flow in the first winding 42 to the earth terminal 34. As the first winding 42 is inductively coupled to the second winding 44, a negative voltage is induced in the second winding 44. The induced negative voltage increases the potential difference across spark gap 40 until this spark gap also triggers. Once both spark gaps 38 and 40 have triggered, the surge current flows through the respective circuit paths of the spark gaps 38 and 40 to the earth terminal 34, thereby distributing the surge current across the two spark gaps 38 and 40.

As the surge current would be shared by the two spark gaps 38 and 40, spark gap 38 will not be exposed to a too high surge current, which reduces the probability of possible damage to and/or the destruction of spark gap 38, which triggered first. The action of inducing a voltage across the second winding 44, once a current flows in the first winding 40, and then to trigger the other spark gap 40 occurs in a very short period of time, i.e. almost instantaneously, which further limits damage to the spark gaps 38 and 40.

Similarly, if spark gap 40 triggers first, a surge current flows in the second winding 44 to the earth terminal 34. Due to the inductive coupling between the first winding 42 and the second winding 44, a negative voltage is induced in the first winding 42, increasing the potential difference across spark gap 38 until this spark gap triggers. Once again, the surge current is distributed between the spark gaps 38 and 40.

Figure 3:
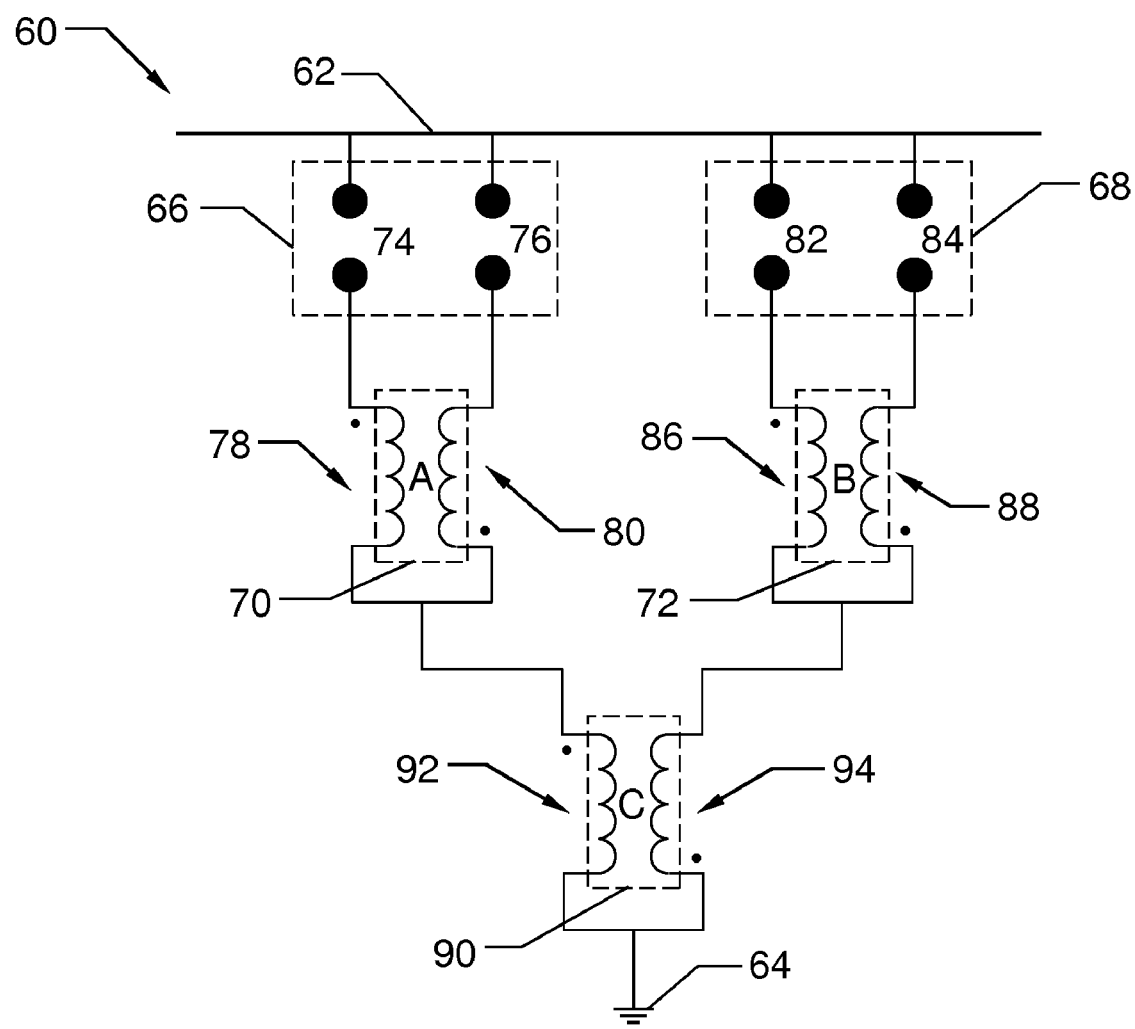
FIG. 3 shows a schematic circuit diagram of a spark gap protection device according to a second embodiment of the invention.

FIG. 3 shows a further embodiment of the invention, where a spark gap protection device 60 is connected between a line 62 (or terminal) and an earth terminal 64, to protect a load (not shown) connected downstream to the spark gap protection device 60 against transient or surge overvoltages and currents.

The spark gap protection device 60 includes two pairs of spark gaps 66 and 68, each pair of spark gaps 66 and 68 respectively being connected to inductively and closely coupled winding pairs A and B, which is generally designated by reference numerals 70 and 72.

The spark gap pair 66 comprises spark gaps 74 and 76, each connected respectively to a first and second winding 78 and 80 of the inductively coupled winding pair A 70. It will be appreciated that the configuration of the spark gap pair 66 and the inductively coupled windings 78 and 80 of winding pair A 70 is similar to that of the configuration described in accordance with FIG. 2.

Similarly, spark gap pair 68 comprises spark gaps 82 and 84, with each spark gap 82 and 84 respectively connected to a first and second winding 86 and 88 of the inductively coupled winding pair B 72.

Forming a cascading arrangement, the windings 78 and 80 of the winding pair A 70 are connected to a first winding 92 of an inductively coupled winding pair C 90, while the windings 86 and 88 of the winding pair B 72 are connected to a second winding 94 of the inductively coupled winding pair C 90.

The operation of this embodiment of the invention is also similar to that of the embodiment according to FIG. 2. If a transient overvoltage causes spark gap 74 to trigger, a surge current will flow to the earth terminal 64 via the winding 78 of the winding pair A 70 and the winding 92 of the winding pair C 90. The surge current flowing in the winding 78 will induce a reverse voltage in the winding 80, increasing the potential difference over the spark gap 76, and triggering this spark gap. The surge current is accordingly distributed between the spark gaps 74 and, 76 of the spark gap pair 66.

The surge current flowing through the winding 92 of the winding pair C 90 also induces a reverse voltage over the winding 94, which increases the potential difference over the spark gap 84, due to the windings 94 and 88 having the same voltage polarity. The increased potential difference over spark gap 84 triggers the spark gap. As soon as a portion of the surge current flows through the spark gap 84 and the winding 88, a voltage is induced in the winding 86 which allows the spark gap 82 also to trigger.

It will be appreciated that the surge current would in this embodiment be shared between the four spark gaps, flowing to the earth terminal in a cascading configuration. As mentioned, the consecutive triggering of the spark gaps occurs within a short period of time and almost instantaneously, thereby to limit any possible damage that may be caused by the surge currents.

Although in the description of the operation of the spark gap protection device of FIG. 3, it was assumed that spark gap 74 triggers first, it would be appreciated that any of the spark gaps 74, 76, 82 or 84 may trigger first. If any of the other spark gaps 76, 82 or 84 triggers first, the induced voltages in related windings will similarly cause all the other spark gaps to trigger.

Figure 4:
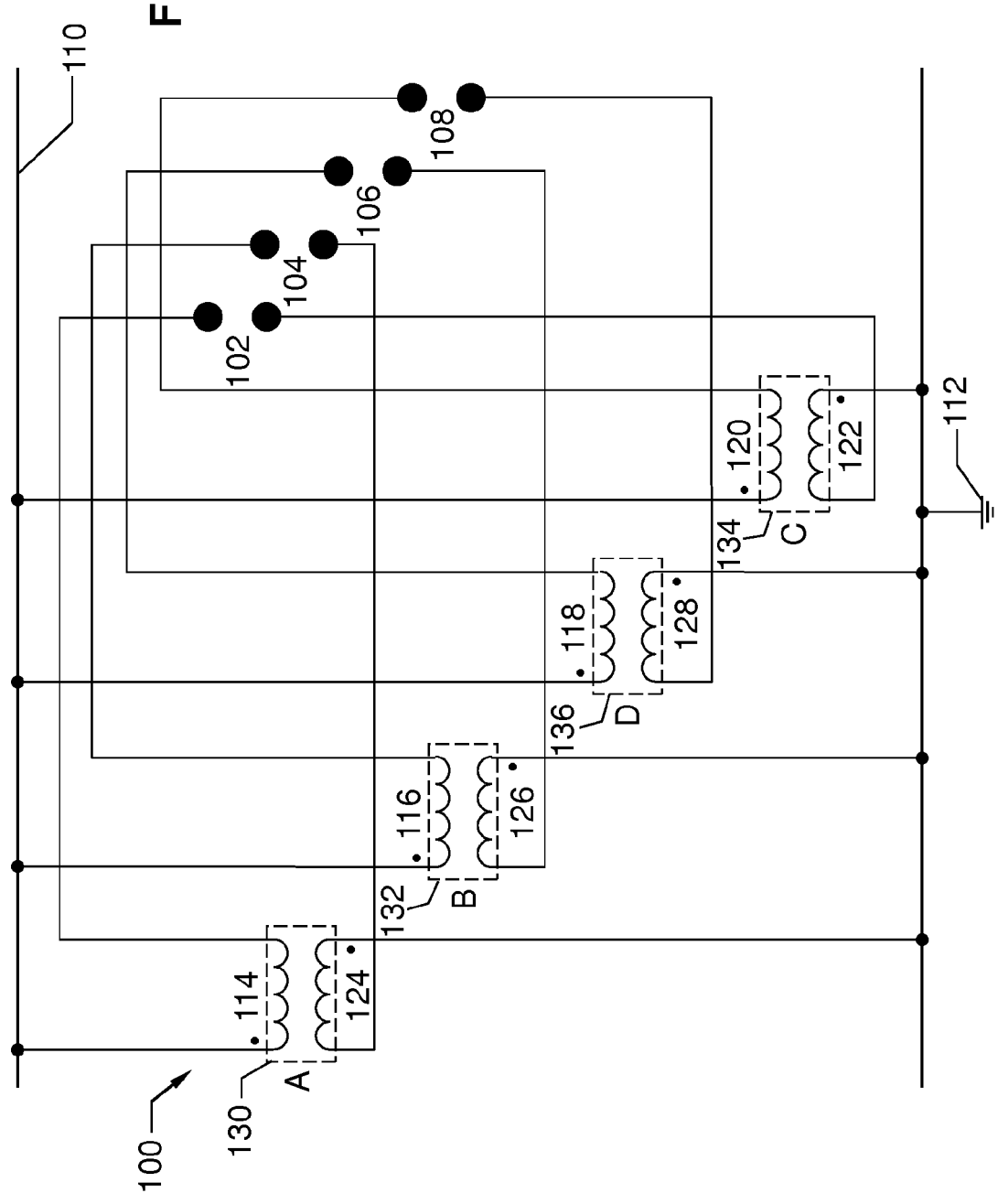
FIG. 4 shows a schematic circuit diagram of a spark gap protection device according to another embodiment of the invention.

FIG. 4 shows a further embodiment of a spark gap protection device 100, with the device 100 comprising four parallel spark gaps 102, 104, 106 and 108. As with the other embodiments, the spark gap protection device 100 is connected between a line terminal 110 and an earth terminal 112, to protect a load (not shown) connected downstream from the spark gap protection device 100.

Each spark gap 102, 104, 106 and 108 has a winding connected to each of its electrodes, i.e. a winding is connected to each end of a spark gap.

For example, each of the spark gaps 102, 104, 106 and 108 is connected to the line terminal 110 respectively via the windings 114, 116, 118 and 120. Similarly, each of the spark gaps 102, 104, 106 and 108 is connected to the earth terminal 112 respectively via the windings 122, 124, 126 and 128. The windings 114 and 124 form an inductively coupled winding pair A 130, while the windings 116 and 126 form an inductively coupled winding pair B 132. Similarly, the windings 120 and 122 form an inductively coupled winding pair C 134, while the windings 118 and 128 form an inductively coupled winding pair D 136.

In the event that the spark gap 102 triggers first, a surge current flows through the winding 114, the spark gap 102 and the winding 122 to the earth terminal 112. The surge current flowing through the winding 114 now induces a voltage in the winding 124, which, as mentioned, forms inductively coupled winding pair A 130 with the winding 114. The induced voltage in the winding 124 increases the potential difference over the spark gap 104, triggering the spark gap and allowing the surge current to be shared between the spark gaps 102 and 104.

Due to the current that flows in the winding 122, a voltage is also induced in the winding 120, which, as mentioned, forms inductively coupled winding pair C 134 with the winding 122. The induced voltage in the winding 120 also increases the potential difference over the spark gap 108, triggering the spark gap and allowing the surge current to also flow partially through this spark gap.

Similar to the above, the surge current will also flow through the spark gap 106, either due to the voltage induced in the winding 126 (due to the current flowing in the winding 116), or due to the voltage induced in the winding 118 (due to the current flowing in the winding 128).

It will be appreciated that the embodiment of FIG. 4 may function with any number of parallel spark gaps, provided that the winding configurations are appropriately matched and that the spark gaps are correctly connected to enable voltages to be induced in corresponding associated windings, allowing the spark gaps to trigger.

In some embodiments of the invention, impedances may be added to the spark gap protection device to better match different spark gaps, in particular to better control the current sharing between the spark gaps. It will be appreciated that the impedances may be connected in series in any position in a line formed by a winding and a spark gap.

To provide additional functionality to the spark gap protection device, the parallel connected spark gaps described in the different embodiments may be used in series or parallel with metal oxide varistors (MOVs), thermal disconnect devices and/or remote fault indication mechanisms.

Figure 5:
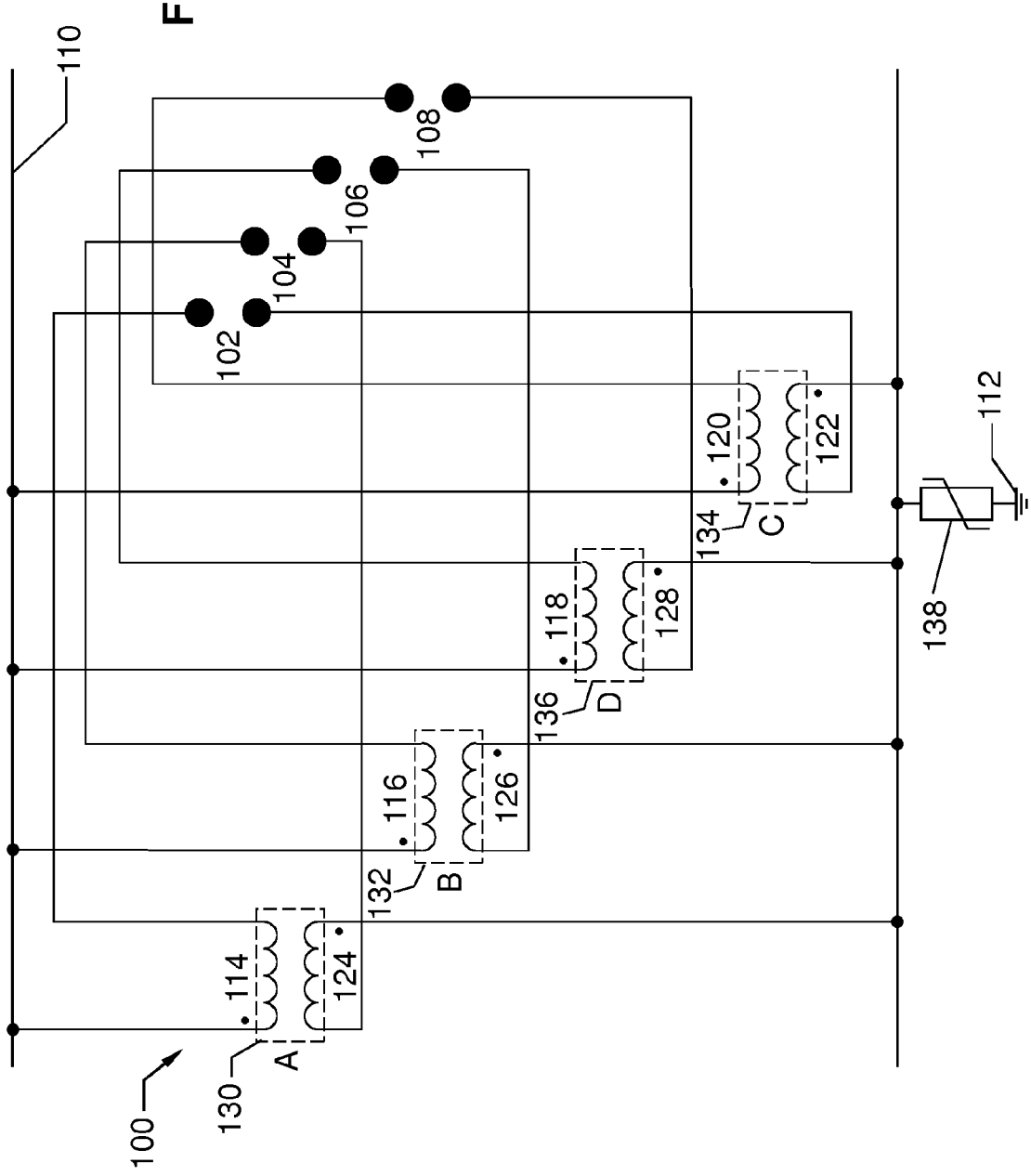
FIG. 5 shows a schematic circuit diagram of a spark gap protection device in accordance with FIG. 4, including one metal oxide varistor connected between some of the windings and an earth terminal.

For example, FIG. 5 shows the spark gap protection device of FIG. 4, but with an additional MOV 138 connected between windings 124, 126, 122 and 128 and the earth terminal 112. As only one MOV 138 is used to connect the entire combination of windings to the earth terminal 112, a high-energy MOV has to be used. This MOV must have at least the same surge current rating as the parallel spark gap combination.

MOVs have the advantage of quenching power frequency follow current, protecting the spark gaps and power supply system from possible damage; thereby also preventing possible tripping of upstream overcurrent protection devices such as circuit breakers. This is because the MOVs ensure that the voltage during the surge is kept above the instantaneous mains voltage, so that this voltage does not collapse.

Figure 6:
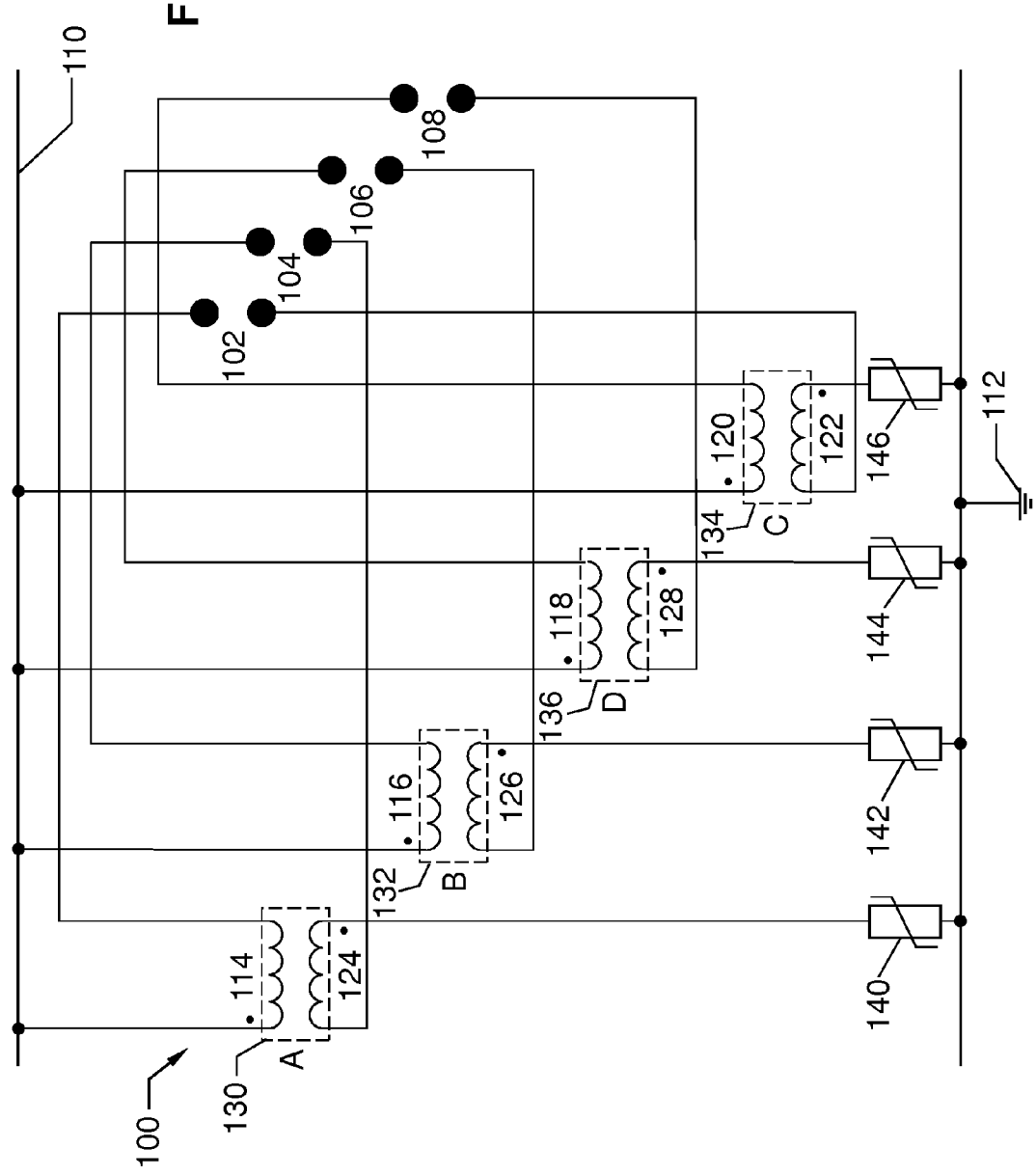
FIG. 6 shows a schematic circuit diagram of a spark gap protection device in accordance with FIG. 4, including multiple metal oxide varistors, each of the metal oxide varistors connected between a winding of a winding pair and an earth terminal.

Alternatively, and as shown in FIG. 6, four MOVs 140, 142, 144 and 146 may connect each of the windings 124, 126, 128 and 122 respectively in series to the earth terminal 112. In this configuration the MOVs may be smaller, thereby reducing cost.

In one embodiment of the invention, a spark gap protection device to be used in a typical 230/400 V system may have the characteristics discussed below.

The spark gap protection device may be connected between a live (or line) terminal and an earth terminal, as described above, or between a neutral terminal and an earth terminal. Alternatively, the spark gap protection device may be connected between a live (or line) terminal and a neutral terminal.

In the system with a voltage rating of 230 V AC, the spark gap protection device has a flashover voltage rating of 400 V DC and a rating of 750 V for a rate of rise of 100 V/µs (based on typical ratings of typical component spark gaps).

Furthermore, the impulse current rating of this example spark gap protection device is typically 10 kA, at a 10/350 µs waveform.

Closely coupled coils form the windings of this example spark gap protection device. The closely coupled coils of the windings are wound in direct contact, by twisting them, on a circular air core of about 1 cm diameter. Alternatively, ferrite (magnetic) cores may be used, although caution has to be used in the implementation of ferrite cores, as these cores may easily saturate at high frequencies. The coils may each have a typical length of about 500 mm.

The windings may be made of copper having a cross-sectional area of approximately 2.5 mm$^2$. It will be appreciated that the windings should preferably be insulated to avoid flashover caused by the high voltages that may be generated between associated windings forming a winding pair. As a precaution, an enamel insulation of the winding may be supplemented with extra sleeving.

It will further be appreciated that the spark gaps as described above are not limited to two-pole spark gaps, and that three-terminal spark gaps, triggered type spark gaps or other commonly available spark gaps also be used in the implementation of the invention.

Figure 7:
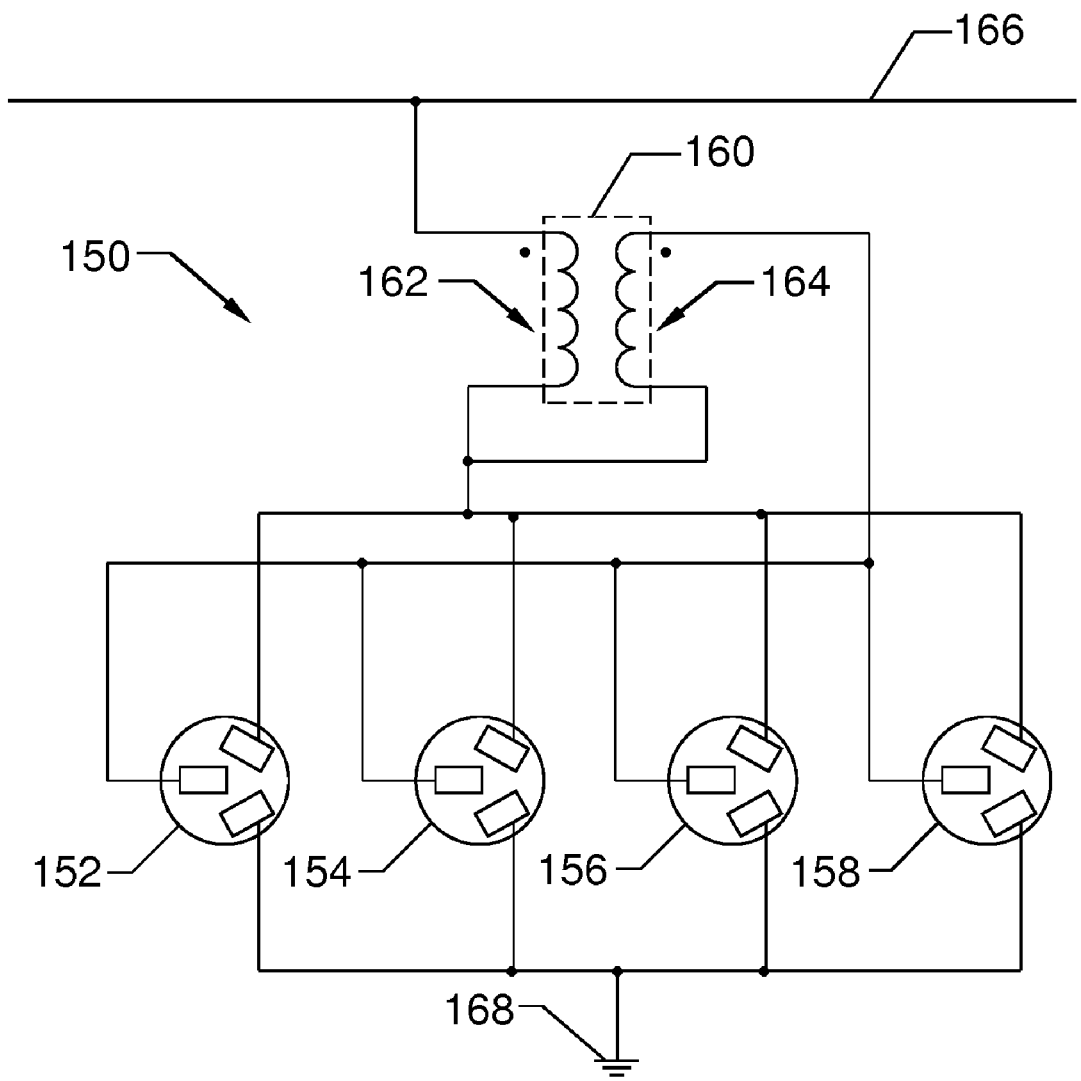
FIG. 7 shows a schematic circuit diagram of a spark gap protection device according to yet a further embodiment of the invention, in which parallel three-terminal spark gaps are connected to a single winding pair.

For example, in FIG. 7 a spark gap protective device 150 comprises four three-terminal spark gaps 152, 154, 156 and 158 which are connected in parallel.

A three-terminal spark gap has three electrodes or terminals, namely a first terminal (or upper terminal), a second terminal (or lower terminal) and a third terminal (or middle terminal). Similar to the two-pole spark gap described above, the three terminals are separated by a suitable insulator. The triggering of a three-terminal spark gap may be between the upper terminal and lower terminal, which is a complete breakdown, flashover or trigger of the spark gap. Alternatively, the triggering of the three-terminal spark gap may be between the upper and middle terminal, or between the middle and lower terminal, which would be a partial breakdown, flashover or trigger of the spark gap.

A first (or upper) terminal of each of the three-terminal spark gaps 152, 154, 156 and 158 is connected to each other and to one end of windings 162 and 164, with windings 162 and 164 being inductively coupled to form winding pair 160. It will be noted that the two windings 162 and 164 are not reverse connected in this embodiment. The first winding 162 of the winding pair 160 is connected to a line terminal 166.

A second (or lower) terminal of each of the three-terminal spark gaps 152, 154, 156 and 158 is connected to an earth terminal 168, while a third (or middle) terminal of each of the three-terminal spark gaps 152, 154, 156 and 158 is connected to each other and to the other end of the second winding 164.

In the event that a transient overvoltage occurs over the spark gap-protection device 150, an increase in the potential difference across any one of the three-terminal spark gaps 152, 154, 156 and 158 may cause one of the spark gaps, for example spark gap 152, to have a complete breakdown or trigger. Once the spark gap 152 has triggered, a surge current will flow through the first winding 162, and the first and second terminal of the spark gap 152 to the earth terminal 168.

The surge current that now flows through the first winding 162 induces a voltage in the second winding 164, which in turn increases the potential difference between the first and third terminals of the remaining spark gaps 154, 156 and 158. This increased potential difference causes the remaining spark gaps 154, 156 and 158 to partially break down or flash over, i.e. a breakdown between the first and third terminals, which enables the first and second terminals to break down (a complete breakdown or trigger), thereby allowing the surge current to be shared by all four three-terminal spark gaps 152, 154, 156 and 158.

This embodiment has the advantage that only one pair of windings is used, while the current is shared by four spark gaps, which reduces the overall cost of the spark gap protective device. It will be appreciated that any number of spark gaps may be used in this configuration.

Variations on this embodiment are also foreseen. For example, the second winding 164 may be connected to the earth terminal 168 instead of the second winding 164 being connected to the first terminals of the spark gaps 152, 154, 156 and 158. Another alternative is to use a higher turns ratio on the winding pair 160, e.g., a 1:2 ratio, where a voltage twice that of the first winding is induced in the second winding, and therefore on the third terminal of any of the spark gaps. Alternatively, a Rogowski coil or any other type of current transformer may be used to trigger the third terminals.

The spark gap protection device is typically secured in an enclosure that can be mounted on a standard rail such as the European DIN rail or the South African mini-rail. Alternatively, the spark gap protection device according to the invention may be used as a component in other protection devices, e.g., a surge protection device having additional functionalities.

In a preferred embodiment of the invention, each spark gap may be a hermetically sealed gas-type spark gap, typically sold as an "off the shelf" component. These spark gaps are cheaper than custom-made components. Also, hermetically sealed spark gaps are manufactured to contain a certain internal gas, and to have a particular internal humidity and pressure, which would not fluctuate during the operation of the spark gaps but would remain constant, irrespective of ambient atmospheric conditions. The electrical protection characteristics of the hermetically sealed spark gaps therefore vary relatively little with ambient atmospheric conditions (e.g. temperature, humidity and pressure), thereby providing predictable and constant protection to the load as long as the ratings of the spark gaps are not exceeded. These may typically be commercially available as "off the shelf components.

This invention allows for the use of smaller rated, "off the shelf" spark gaps in a spark gap protection device. This feature, together with the fact that no special machining or matching is needed in the manufacture of the spark gap protection device, ensures that the manufacture of the spark gap protection device is cost-effective.

The spark gap protection device of this invention allows parallel spark gaps to fire at the same time or almost instantaneously, thereby distributing the surge current between the spark gaps. The result is that the lower rated spark gaps do not exceed their surge current rating.

The invention claimed is:

1. A spark gap protection device in use connected between a line and an earth terminal to protect a load against transient or surge overvoltages and/or overcurrents, the spark gap protection device comprising multiple pairs of first and second spark gaps, each first spark gap being connected to at least one winding which is inductively coupled to an associated winding connected to the second spark gap of the pair of spark gaps, so that, in use, a surge current flowing across the first spark gap and through a winding connected to the first spark gap induces a voltage in the associated inductively coupled winding connected to the second spark gap of the pair of spark gaps, forcing the second spark gap to trigger, and further wherein the inductively coupled windings of each pair of spark gaps are connected to another winding which is in turn inductively coupled to a winding connected to inductively coupled windings of another pair of spark gaps, thereby for the spark gap protection device to divert a surge or transient current to the earth terminal distributing the surge current between the spark gaps.

2. A spark gap protection device in use connected between a line and an earth terminal to protect a load against transient or surge overvoltages and/or overcurrents, the spark gap protection device comprising a plurality of spark gaps, each spark gap being connected to a winding on each side of the spark gap and wherein each winding is inductively coupled to an associated winding connected to another spark gap so that, in use, a surge current flowing across the spark gap and through a winding connected to the spark gap induces a voltage in the associated inductively coupled winding connected to another spark gap, forcing the other spark gap to trigger, thereby distributing the surge current between the spark gaps, thereby for the spark gap protection device to divert a surge or transient current to the earth terminal distributing the surge current between the spark gaps.

3. A spark gap protection device according to claim 1, wherein the inductively coupled windings are reverse connected, with a positive voltage in the one winding inducing a negative voltage in the other winding.

4. A spark gap protection device according to claim 1, wherein each of the spark gaps is hermetically sealed.

5. A spark gap protection device according to claim 1, wherein each of the inductively coupled windings has a corresponding core.

6. A spark gap protection device according to claim 2, wherein the inductively coupled windings are reverse connected, with a positive voltage in the one winding inducing a negative voltage in the other winding.

7. A spark gap protection device according to claim 2, wherein each of the spark gaps is hermetically sealed.

8. A spark gap protection device according to claim 2, wherein each of the inductively coupled windings has a corresponding core.

* * * * *